United States Patent
Larson et al.

(10) Patent No.: US 11,507,991 B2
(45) Date of Patent: Nov. 22, 2022

(54) SYSTEMS AND METHODS FOR SCALING FRAMED IMAGES

(71) Applicant: Walmart Apollo, LLC, Bentonville, AR (US)

(72) Inventors: Michael Kingsbury Larson, Chapel Hill, NC (US); Warren Lee Shoff, Canal Winchester, OH (US); Steven Matthew Farmer, Reynoldsburg, OH (US); Brett Raymond Stone, Canal Winchester, OH (US); Robert Dean Wenger, Centerberg, OH (US); Timothy Wayne Stevens, Groveport, OH (US)

(73) Assignee: Walmart Apollo, LLC, Bentonville, AR (US)

( * ) Notice: Subject to any disclaimer, the term of this patent is extended or adjusted under 35 U.S.C. 154(b) by 154 days.

(21) Appl. No.: 16/893,909

(22) Filed: Jun. 5, 2020

(65) Prior Publication Data
US 2021/0383449 A1  Dec. 9, 2021

(51) Int. Cl.
*G06Q 30/00* (2012.01)
*G06Q 30/06* (2012.01)
(Continued)

(52) U.S. Cl.
CPC ..... *G06Q 30/0621* (2013.01); *G06Q 30/0641* (2013.01); *H04N 1/00143* (2013.01); *H04N 1/00413* (2013.01); *H04N 1/393* (2013.01)

(58) Field of Classification Search
CPC .............. G06Q 30/00; G06Q 30/0601; G06Q 30/0623; G06Q 30/0627
See application file for complete search history.

(56) References Cited

U.S. PATENT DOCUMENTS 5,546,689 A * 8/1996 Bomze .................... A47G 1/08
40/739
8,135,617 B1 * 3/2012 Agostino ........... G06Q 30/0241
705/1.1
(Continued)

OTHER PUBLICATIONS

Rist, Thomas, et al. "Care-extending a digital picture frame with a recommender mode to enhance well-being of elderly people." 2015 9th International Conference on Pervasive Computing Technologies for Healthcare (PervasiveHealth). IEEE, 2015. (Year: 2015).*
(Continued)

*Primary Examiner* — Christopher B Seibert
(74) *Attorney, Agent, or Firm* — Morgan, Lewis & Bockius LLP; Manita Rawat

(57) ABSTRACT

This application relates to systems and methods for scaling and assembling framed images, and to offering the framed images for purchase. In some embodiments, a computing device is configured to receive a first customer selection of a frame style and a frame size, where the frame size indicates dimensions of a frame window. The computing device is also configured to receive a second customer selection of a mat style. Further, the computing device is configured to determine, based at least on the dimensions of the frame window and the mat style, a mat size, where the mat size includes dimensions of a mat window. The computing device is also configured to determine, based at least on the dimensions of the mat window, an image size for an image. For example, the computing device may execute a rule-based model, or a machine learning model, to determine the image size.

19 Claims, 6 Drawing Sheets

(51) Int. Cl.
*H04N 1/00* (2006.01)
*H04N 1/393* (2006.01)

(56) References Cited

U.S. PATENT DOCUMENTS

| | | | | |
|---|---|---|---|---|
| 2002/0165931 | A1* | 11/2002 | Greer | G06Q 30/02 |
| | | | | 709/217 |
| 2005/0044485 | A1* | 2/2005 | Mondry | G06T 11/60 |
| | | | | 715/255 |
| 2005/0093888 | A1* | 5/2005 | Rao | G06T 11/00 |
| | | | | 345/629 |
| 2009/0088203 | A1* | 4/2009 | Havens | G06K 7/10881 |
| | | | | 235/462.11 |
| 2009/0122329 | A1* | 5/2009 | Hegemier | G06T 11/60 |
| | | | | 358/1.9 |
| 2012/0072179 | A1* | 3/2012 | Patel | G06F 30/00 |
| | | | | 703/1 |
| 2013/0304609 | A1* | 11/2013 | Keonorasak | G06Q 30/00 |
| | | | | 705/26.8 |
| 2014/0072242 | A1* | 3/2014 | Wei | G06T 3/0056 |
| | | | | 382/299 |
| 2014/0245166 | A1* | 8/2014 | Morton | G06F 3/0482 |
| | | | | 715/811 |
| 2018/0315217 | A1* | 11/2018 | Merzeci | H04N 9/3179 |

OTHER PUBLICATIONS

Parmar, Niki, et al. "Image transformer." International conference on machine learning. PMLR, 2018. (Year: 2018).*

"Your Guide to Photo Printing (and Framing)", https://www.levelframes.com/blog/your-guide-to-photo-printing-and-faming, p. 1-4.

"Frame Your Best Pictures", https://www.levelframes.com/photos, p. 1-11.

* cited by examiner

SYSTEMS AND METHODS FOR SCALING FRAMED IMAGES

TECHNICAL FIELD

The disclosure relates generally to framing systems and, more specifically, to systems and methods for scaling and assembling framed images.

BACKGROUND

Retailers may offer framed images for purchase through a website. The retailer may have pre-printed paper copies of various images that are available for purchase. A customer may select one of the images, and then select one or both of a mat and frame to create a customized framed image. While customers value the ability to create a framed image customized to their tastes, the current processes for creating custom framed images are inefficient and improvements to those processes are desirable.

SUMMARY

The embodiments described herein are directed to scaling and assembling framed images. In accordance with various embodiments, exemplary systems may be implemented in any suitable hardware or hardware and software, such as in any suitable computing device.

For example, in some embodiments, a system includes a computing device. The computing device is configured to receive a first customer selection of a frame style and a frame size, the frame size indicating dimensions of a frame window. The computing device is also configured to receive a second customer selection of a mat style. Further, the computing device is configured to determine, based at least on the dimensions of the frame window and the mat style, a mat size, the mat size including dimensions of a mat window. The computing device is also configured to determine, based at least on the dimensions of the mat window, an image size for an image. For example, the computing device may execute a rule-based model, or a machine learning model, to determine the image size.

In some embodiments, a method by a computing device includes receiving, at the computing device, a first customer selection of a frame style and a frame size, the frame size indicating dimensions of a frame window. The method also includes receiving at the computing device a second customer selection of a mat style. The method further includes determining, based at least on the dimensions of the frame window and the mat style, a mat size, the mat size including dimensions of a mat window. The method also includes determining, based at least on the dimensions of the mat window, an image size for an image. For example, the image size may be determined based on execution of a rule-based model, or a machine learning model.

In other embodiments, a non-transitory computer readable medium has instructions stored thereon, where the instructions, when executed by at least one processor, cause a device to perform operations including receiving a first customer selection of a frame style and a frame size, the frame size indicating dimensions of a frame window. The operations also include receiving a second customer selection of a mat style. Further, the operations include determining, based at least on the dimensions of the frame window and the mat style, a mat size, the mat size including dimensions of a mat window. The operations also include determining, based at least on the dimensions of the mat window, an image size for an image. For example, the image size may be determined based on execution of a rule-based model, or a machine learning model.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
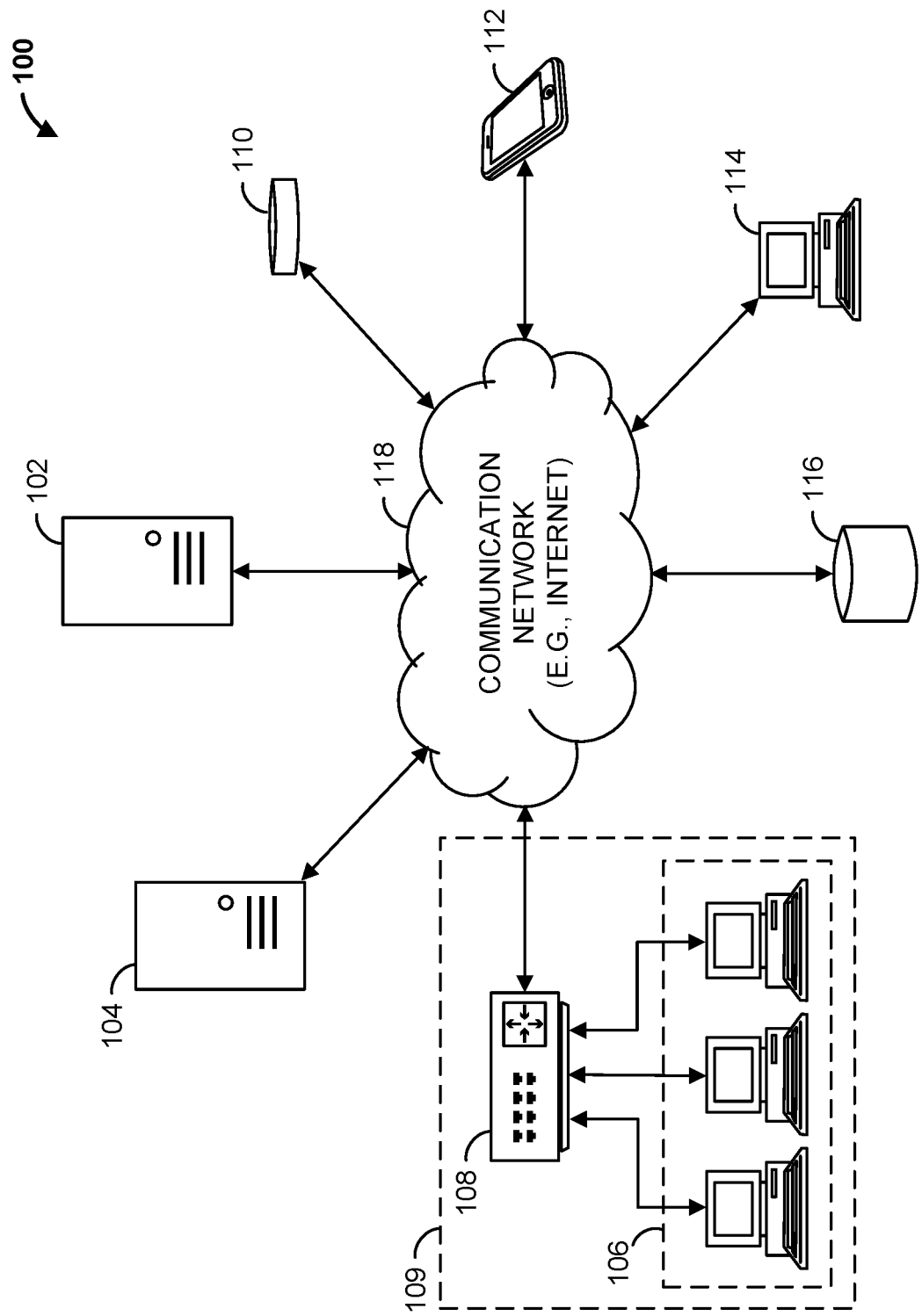
FIG. 1 is a block diagram of a framed image ordering system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

As described above, retailers may offer framed images for purchase through a website. In a typical example, a customer may browse a library of images through the website, and then select a desired image to be framed. The library of images may contain images having a wide variety of image dimensions.

Figure 4:
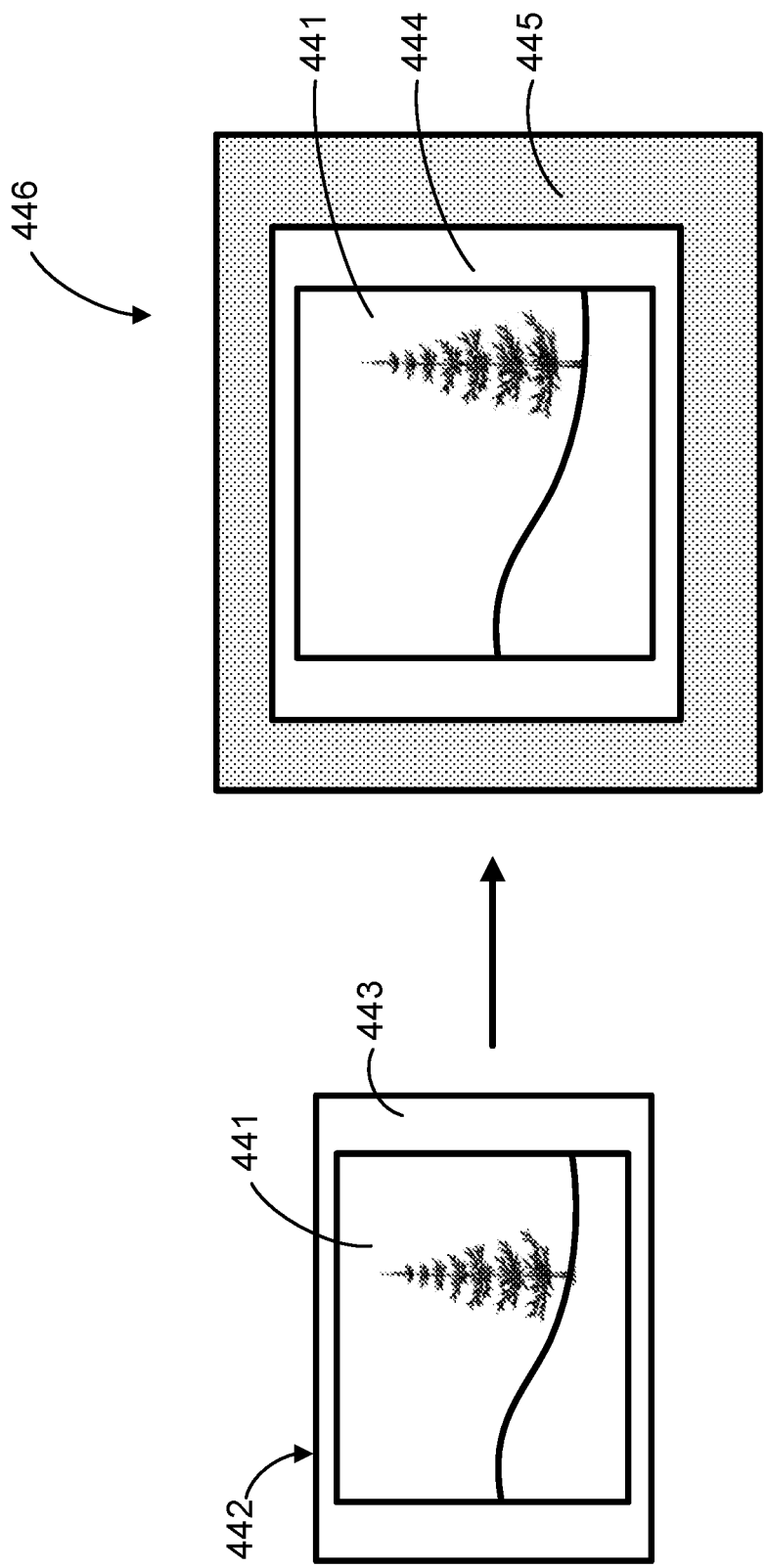
FIG. 4 is a schematic view illustrating an example of framed image ordering and sizing.

FIG. 4 is a schematic view illustrating an example of framed image ordering and sizing. The retailer may have pre-printed paper images available for sale through the website, such as the image 441 on sheet 442. As shown, a printed image 441 will typically not fill the entire dimensions of the sheet 442, such that some border area 443 is present. Since the available images are pre-printed, the dimensions of the image 441 are established prior to offering the image 441 on the website for sale to a customer.

Once a customer selects an image 441, the website may further prompt the selection of a mat style and thickness, and a frame style and thickness. For example, a mat 444 and frame 445 are shown as an assembled framed image 446. Once each parameter has been selected, the customer may finalize and submit an order for the purchase of the customized framed image 446.

Upon receipt of the order, the retailer must assemble the framed image 446 and ship it to the customer. The retailer typically begins by cropping excess material (e.g. border area 443) from a sheet 442 having the selected image 441, then creating a custom-sized mat 444 and creating a custom-sized frame 445. Each parameter selected by the customer when placing an order may alter the final, overall size of the framed image 446. The result is a highly inefficient system, where each customer order generally requires a customized assembly of a printed image 441, a mat 444, and a frame 445.

While it is not desirable to simply mass produce a set of framed images for purchase —this would remove a customer's ability to customize their framed image and would likely lead to oversupply of low demand images—it is desirable to create more efficient systems and methods of providing customizable framed images to customers.

The present disclosure is directed to systems and methods for scaling framed images that overcome the deficiencies noted above. More specifically, the present disclosure is directed to systems and methods in which an image size is determined based on a selected frame and/or mat size and/or style, rather than vice versa. For example, in some embodiments a customer may select a frame style and/or frame size, and may then select a mat style and/or mat size based on the selected frame style and/or size. After one or more of these selections, a customer-selected image may be scaled to accommodate the dimensions of the mat window. By determining the image size based on prior selections of the frame and/or mat parameters, the present disclosure overcomes at least one or more of the shortcomings noted above.

Turning to the drawings, FIG. 1 illustrates a block diagram of an framed image ordering system 100 that includes an framed image computing device 102 (e.g., a server, such as an application server), a web server 104, workstation(s) 106, database 116, and multiple customer computing devices 110, 112, 114 operatively coupled over network 118. Framed image computing device 102, workstation(s) 106, server 104, and multiple customer computing devices 110, 112, 114 can each be any suitable computing device that includes any hardware or hardware and software combination for processing and handling information. In addition, each can transmit data to, and receive data from, communication network 118.

For example, framed image computing device 102 can be a computer, a workstation, a laptop, a server such as a cloud-based server, or any other suitable device. Each of multiple customer computing devices 110, 112, 114 can be a mobile device such as a cellular phone, a laptop, a computer, a table, a personal assistant device, a voice assistant device, a digital assistant, or any other suitable device.

Additionally, each of framed image computing device 102, web server 104, workstations 106, and multiple customer computing devices 110, 112, 114 can include one or more processors, one or more field-programmable gate arrays (FPGAs), one or more application-specific integrated circuits (ASICs), one or more state machines, digital circuitry, or any other suitable circuitry.

Although FIG. 1 illustrates three customer computing devices 110, 112, 114, framed image ordering system 100 can include any number of customer computing devices 110, 112, 114. Similarly, framed image ordering system 100 can include any number of workstation(s) 106, framed image computing devices 102, servers 104, and databases 116.

Workstation(s) 106 are operably coupled to communication network 118 via router (or switch) 108. Workstation(s) 106 and/or router 108 may be located at a store 109, for example. Workstation(s) 106 can communicate with framed image computing device 102 over communication network 118. The workstation(s) 106 may send data to, and receive data from, framed image computing device 102. For example, the workstation(s) 106 may transmit data related to framed image selections such as frame style/size, mat style/size, and/or image selection. The workstation(s) 106 may additionally transmit data relating to a purchase order, such as for the purchase of one or more items such as framed images, to framed image computing device 102. In some examples, framed image computing device 102 receives the data transmitted from the workstation(s) 106 and may transmit an acknowledgement of receipt and/or a confirmation of the purchase order.

Framed image computing device 102 is also operable to communicate with database 116 over communication network 118. For example, framed image computing device 102 can store data to, and read data from, database 116. Database 116 can be a remote storage device, such as a cloud-based server, a memory device on another application server, a networked computer, or any other suitable remote storage. Although shown remote to framed image computing device 102, in some examples, database 116 can be a local storage device, such as a hard drive, a non-volatile memory, or a USB stick. Database 116 may store, for example, customer parameter selections, framed image purchase orders, and/or dimensions associated with various frame styles and sizes, mat styles and sizes, or images. Database 116 may also store transaction data identifying sales of items such as framed images conducted online, such as on a webpage hosted by web server 104.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

First customer computing device 110, second customer computing device 112, and $N^{th}$ customer computing device 114 may communicate with web server 104 over communication network 118. For example, web server 104 may host one or more webpages of a website. Each of multiple computing devices 110, 112, 114 may be operable to view, access, and interact with the webpages hosted by web server 104. In some examples, web server 104 hosts a webpage for a retailer that allows for the purchase of items such as framed images. For example, the web page may list prices for advertised items. An operator of one of multiple computing devices 110, 112, 114 may access the webpage hosted by web server 104, add one or more items to an online shopping cart of the webpage, and perform an online checkout of the shopping cart to purchase the items. Web server 104 may transmit data related to the purchase of the items to framed image computing device 102.

Framed image computing device 102 may process data received from one or more of the computing devices 110, 112, 114 and/or from web server 104. Data processing at the framed image computing device 102 may be an iterative process, such that a first selection by a customer (e.g. selection of a frame size) may prompt the framed image computing device 102 to present a set of options for additional customer selection (e.g. a set of mat styles and/or mat dimensions, based on the selected frame size). A second selection by the customer (e.g. mat style and/or mat dimensions) may further prompt the framed image computing device 102 to present additional options for customer selection (e.g. an image).

In some embodiments, the framed image computing device 102 receives a customer selection first of a frame style and/or frame size. Upon selection of the frame style and/or frame size, the framed image computing device 102 may then present options to the customer via the webpage for selection of a mat style and/or mat size. Upon selection of the mat style and/or mat size, the framed image computing device 102 may then present options to the customer via the webpage for selection of an image to be framed. In some embodiments, the framed image computing device 102 will determine the image size based on customer selections of one or more of the frame style, frame size, mat style, and/or mat size.

In some embodiments, the framed image computing device 102 receives a customer selection first of an image that is desired to be purchased. The framed image computing device 102 may then present options to the customer via the webpage for selection of a frame style and/or frame size. Upon selection of the frame style and/or frame size, the framed image computing device 102 may then present options to the customer via the webpage for selection of a mat style and/or mat size. In some embodiments, the framed image computing device 102 will determine the image size based on customer selections of one or more of the frame style, frame size, mat style, and/or mat size.

Figure 2:
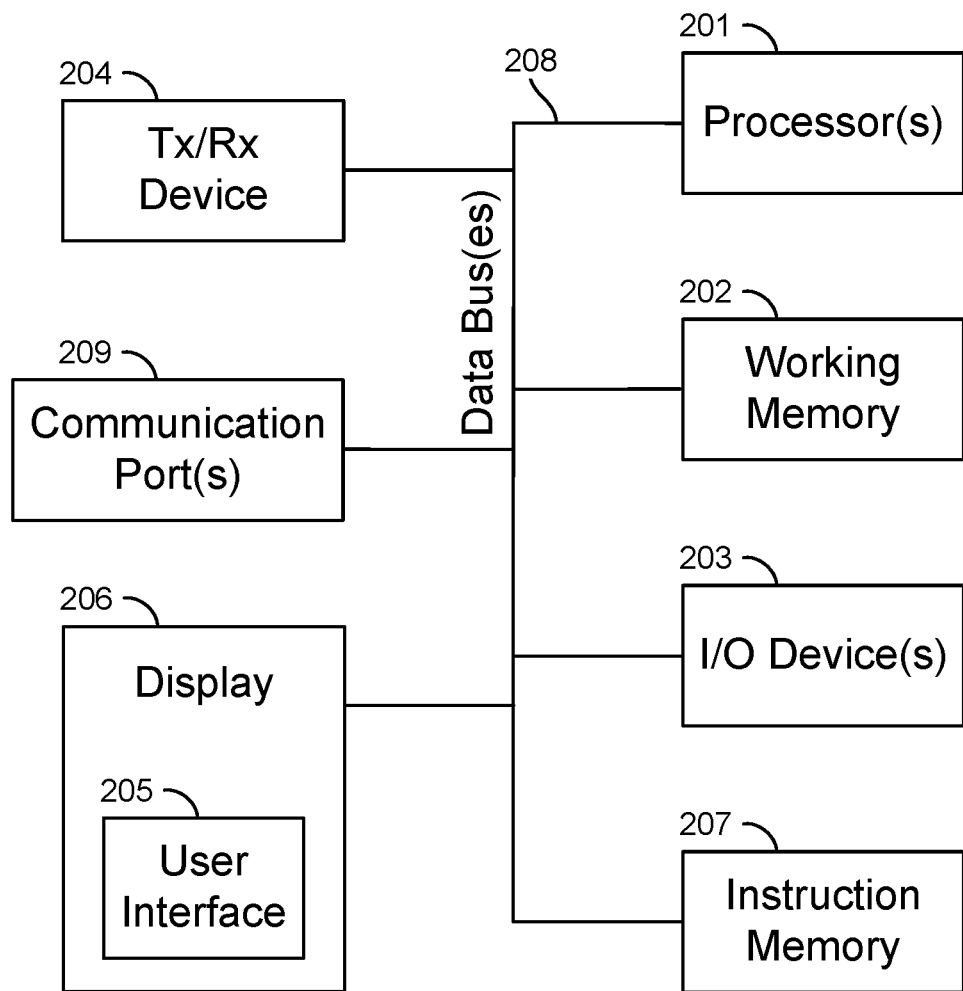
FIG. 2 is a block diagram of the framed image computing device of the framed image ordering system of FIG. 1 in accordance with some embodiments.

FIG. 2 illustrates the framed image computing device 102 of FIG. 1. Framed image computing device 102 can include one or more processors 201, working memory 202, one or more input/output devices 203, instruction memory 207, a transceiver 204, one or more communication ports 209, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of framed image computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 207 allows for the programming of executable instructions in instruction memory 207. In some examples, communication port(s) 207 allow for the transfer (e.g., uploading or downloading) of data, such as machine learning algorithm training data.

Display 206 can display user interface 205. User interfaces 205 can enable user interaction with framed image computing device 102. For example, user interface 205 can be a user interface for an application of a retailer that allows an associate to view customer selections, options for various framed image parameters, and or purchase order information. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 framed image computing device 102 will be operating in. Processor(s) 201 is operable to receive data from, or send data to, a network, such as communication network 118 of FIG. 1, via transceiver 204.

Figure 5:
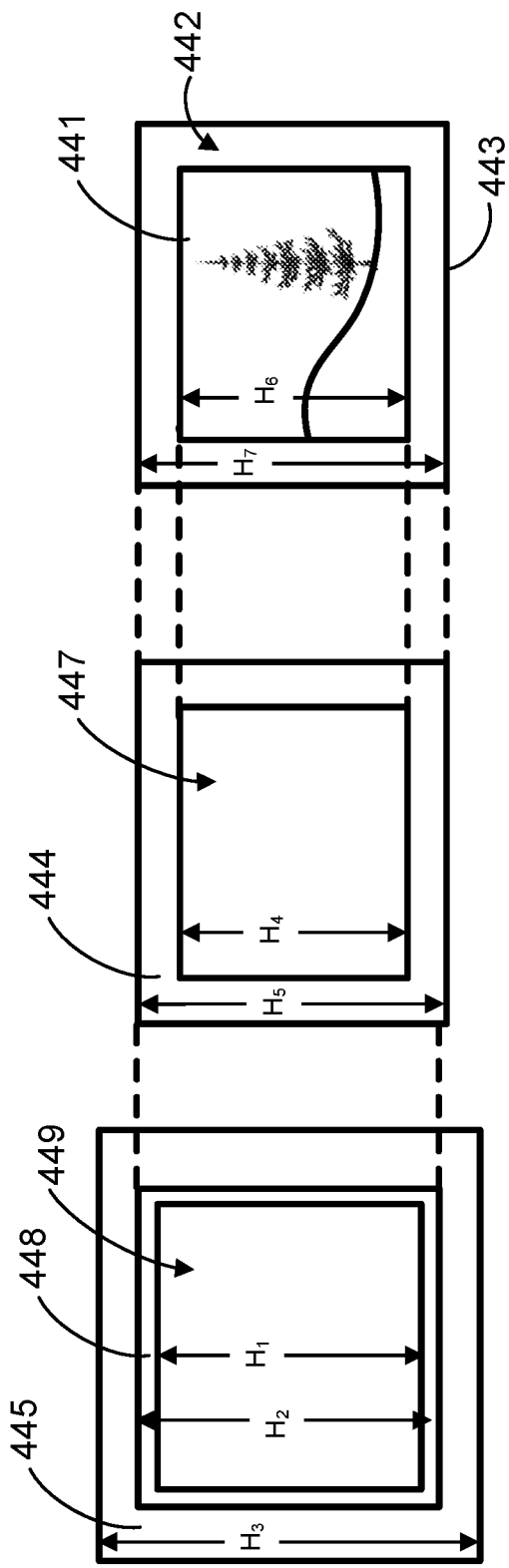
FIG. 5 is a schematic view illustrating an example of image ordering and sizing with the framed image computing device of FIG. 2 in accordance with some embodiments.

FIG. 5 provides an example of the customer ordering process that may be prompted and executed by framed image computing device 102. In a typical embodiment, the customer may first browse a set of images 441 that are available for purchase as a framed image 446. The set of images 441 are typically displayed digitally via a website, which may be hosted by the retailer (e.g., web server 104). Once a customer selects an image 441 that they would like to purchase, the framed image computing device 102 may present to the customer additional parameters for selection. Those additional parameters may include, for example, the frame style, frame dimensions, mat style, and/or mat dimensions.

In some embodiments, upon selecting an image 441, the framed image computing device 102 may provide the customer a set of frame sizes of one or more frames 445 in which the image 441 may be purchased. Once a frame size selection is received, the framed image computing device 102 may then provide the customer with a set of frame styles of the one or more frames 445 that are available in the selected size. Once the parameters of the frame 445 are established, the framed image computing device 102 may provide the customer with a set of mat sizes and/or mat styles that are available for one or more mats 444.

Once the parameters are defined for the frame 445 and the mat 444, the framed image computing device 102 may scale the image 441 to dimensions that match or nearly match the window 447 defined by the mat 444. In other words, the framed image computing device 102 may determine the image size based on the dimensions of the frame 445 and/or mat 444. The image size may equal or substantially equal the dimensions of the mat window 447, with substantially equal defining dimensions within a quarter of an inch.

In some embodiments, a customer may be prompted to select both an image 441 for purchase and a size of the framed image 446. For example, each image 441 in a set of images 441 may include selection options for the various sizes in which the image 441 may be purchased. These sizes may be standard sizes in some examples.

To provide a more specific example, a customer may browse a set of images 441 available for purchase on a retailer's website. The customer may select an image 441, such as a landscape. The framed image computing device 102 may then prompt the customer to select between one of three sizes for the image: 8×10, 16×20, or 18×24. Once the customer has selected a size of 16×20, the framed image computing device 102 may determine frame styles that would be available in that size. The frame 445 may have an outer Cdimension of 16×20, and may have a window dimension of 14×18 (i.e. the frame 445 is one inch thick).

Based on the selection of the frame style and frame size, the framed image computing device 102 may provide a set of mat styles and/or mat sizes that would be available for the framed image 446. The customer may select a mat style (i.e. grey, textured) and a mat size (i.e. 1½ inches thick), and the framed image computing device 102 receives the customer selections. The framed image computing device 102 may determine the side of the mat 444 such that the mat 444 fits within and substantially flush with a frame rabbet 448.

Based on the selection of the mat size, the mat window 447 will be 11×15. The framed image computing device 102 may now scale the image 441 to be equal to or substantially equal to the mat window 447. The image 441 may be printed on demand based on the determination by the framed image computing device 102 of the image dimensions.

As shown in FIG. 5, a frame window 449 defined by the frame 445 may have a first height H1, and the frame rabbet 448 defined by the frame 445 may have a second height H2 that is greater than the first height H1. The frame itself 445 may have a third height H3, and in some embodiments the third height H3 is part of the dimensions presented to the customer when selecting a framed image size.

The mat 444 may define a frame window 447 having a fourth height H4 and the mat 444 itself may have a fifth height H5. The fifth height H5 may be equal to or substantially equal to the second height H2, or may be between the second height H2 and the first height H1.

The image 441 may have a sixth height H6, and the sheet 442 on which the image 441 is printed may have a seventh height H7. The seventh height H7 may be equal to or substantially equal to the second height H2, or may be between the fourth height H4 and the second height H2.

By determining the size of the image 441 based on received customer selections of frame size and/or mat size, the presently disclosed systems and methods are advantageous over those of the prior art. Specifically, the present disclosure provides a frame image ordering system that reduces the need to create customized matting and framing for each purchased image. This allows for standardization in sizing, while the image itself is scaled to be compatible with the many choices offered to the customer in terms of frame style and size and mat style and size. The present disclosure therefore greatly improves efficiency of fulfilling framed image orders, while still provided a wide range of flexibility and variety to a customer looking to purchase a customized framed image.

To properly size an image, framed image computing device 102 may employ one or more rule-based models (e.g., algorithms) and/or one or more machine learning based models. Framed image computing device 102 may receive customer selection data and/or purchase order data relating to framed image purchases such as at store 109, and determine, based on execution of the one or more rule-based models and/or machine learning models, the proper size of an image to fit one or both of the dimensions of the mat window and frame window. Similarly, framed image computing device 102 may receive online transaction data identifying purchases at a website, such as a website hosted by web server 104, and determine, based on execution of the one or more rule-based models and/or machine learning models, the proper size of an image to fit one or both of the dimensions of the mat window and frame window.

In some examples, a rule-based model may include one or more rules, such as predetermined rules, that operate on the framed image selection data (e.g., store transaction data or online transaction data) to properly size an image. The rules may, in some examples, be implemented as algorithms. The rules may be based on frame styles, frame sizes, mat styles, mat sizes, and image selection, for example. Each rule-based model may employ one or more rules. Based on the outcome of each rule (e.g., whether the rule is violated or not), the rule-based model may generate a value (e.g., score). For example, if no rules are violated, the value may be 0. If one rule is violated, the value may be 1. If two rules are violated, the value may be 2, and so forth. In some examples, the rule-based model applies a weight based on the result of each rule. For example, a first rule may be weighted 20%, a second rule may be weighted 60%, and each of a third rule and fourth rule may be weighted 10%. For example, assuming the first rule and fourth rule are not violated, but the second rule and third rule are violated, the rule-based model may generate a value of 70 (based on a 100 point scale).

Figure 3:
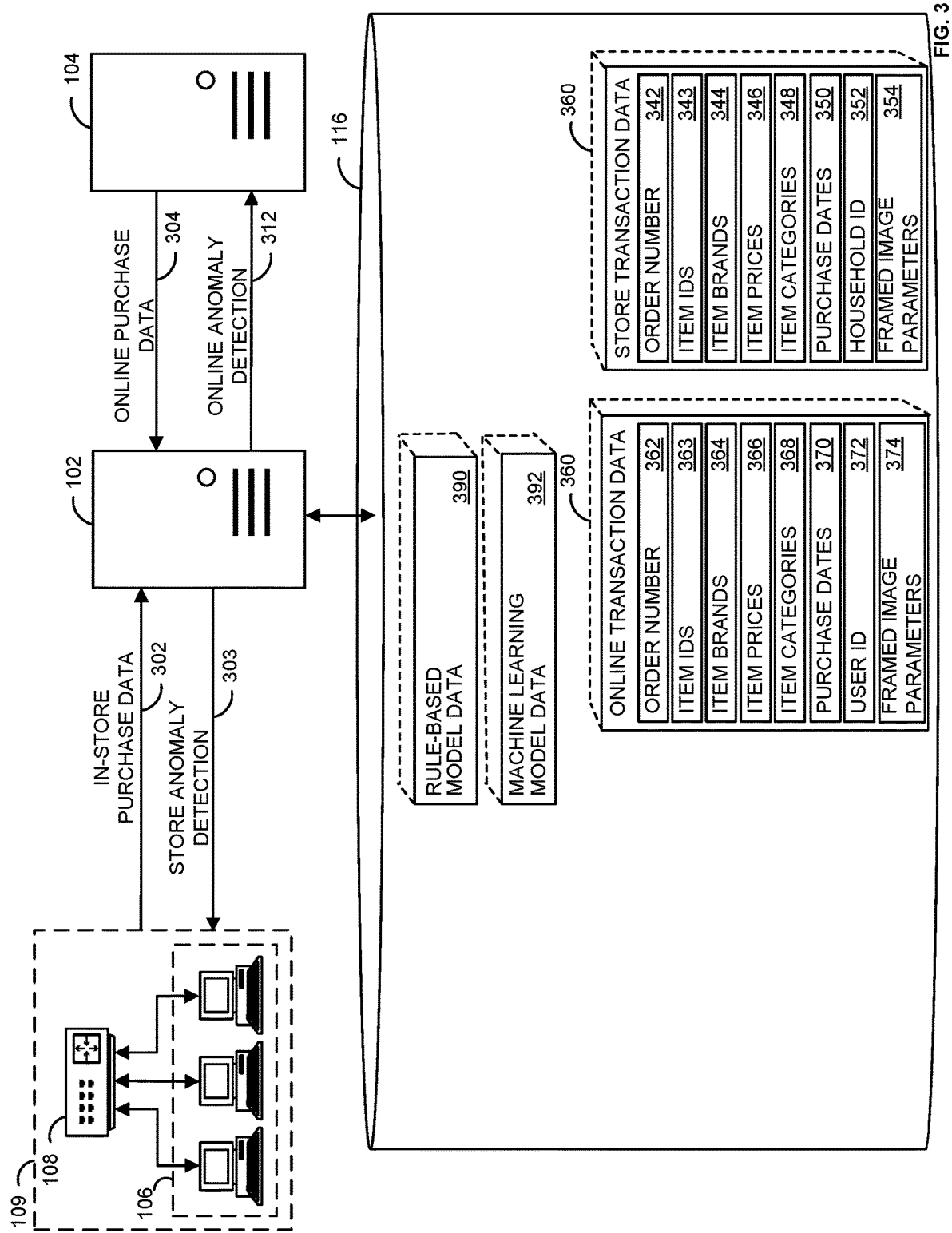
FIG. 3 is a block diagram illustrating examples of various portions of the framed image ordering system of FIG. 1 in accordance with some embodiments.

FIG. 3 is a block diagram illustrating examples of various portions of the framed image ordering system 100 of FIG. 1. As indicated in the figure, framed image computing device 102 may receive in-store purchase data 302 identifying and characterizing one or more framed image purchases from one or more stores 109. Framed image computing device 102 may parse in-store purchase data 302 to generate store transaction data 340, and may store user transaction data 340 in database 116. In this example, store transaction data 340 may include, for each purchase order, one or more of: an order number 342 identifying a purchase order, item IDs 343 identifying one or more items purchased in the purchase order, item prices 346 identifying the price of each item purchased, a purchase date 350 identifying the purchase date of the purchase order, item categories 348 identifying a category of each item, framed image parameters 354 that may include a selected image, frame size, frame style, mat size, and mat style, and a household ID 352 associated with the customer that purchased the order. Household ID 352 may be, for example, an address, a phone number, a surname, or any other information associated with the customer.

Similarly, framed image computing device 102 may receive online purchase data 304 from web server 104, which identifies and characterizes one or more online purchases, such as from a retailer's website. Framed image computing device 102 may parse online purchase data 304 to generate online transaction data 360, and may store online transaction data 360 in database 116. In this example, online transaction data 360 may include, for each purchase order, one or more of: an order number 362 identifying a purchase order, item IDs 363 identifying one or more items purchased in the purchase order, item prices 366 identifying the price of each item purchased, a purchase date 370 identifying the purchase date of the purchase order, item categories 368 identifying a category of each item, framed image parameters 374 that may include a selected image, frame size, frame style, mat size, and mat style, and a user ID 352 associated with the customer that purchased the order. User ID 372 may be, for example, a username the customer uses to log in to the website, or any other customer identifier.

For each order identified by in-store purchase data 302 and/or online purchase data 304, framed image computing device 102 may identify the purchase of an image, such as image 441, and determine an image size for a framed image based in part on one or more of the image, frame style, frame size, mat style, and/or mat size, consistent with the description above. For example, framed image computing device 102 may obtain rule-based model data 390 from database 116, parse rule-based model data 390 to extract the rule-based model, and may execute the rule-based model to determine image sizes for purchased images. In some examples, framed image computing device 102 identifies purchased images based on an item ID (such as item ID 363 or item ID 373), and executes the rule-based model to determine the image size for each purchased image.

Similarly, framed image computing device 102 may obtain machine learning model data 392 from database 116, parse machine learning model data 392 to extract the machine learning model, and may execute the machine learning model to determine an image size for purchased images. In some examples, framed image computing device 102 trains the machine learning model with one or more of online transaction data 360 and store transaction data 340. Based on the training, the machine learning model, when executed, may be trained to identify (e.g., classify) items in a purchase order as images (e.g., purchased images), and may further be trained to identify frame and/or mat options (e.g., styles, types, sizes, etc.) corresponding to each image.

Framed image computing device 102 may execute the rule-based model and/or the machine learning model as in-store purchase data 302 and/or online purchase data 304 is received to determine image sizing for purchased images, and may process the orders for image printing and framed image assembly. In some examples, framed image computing device 102 executes the machine learning model to identify images in a purchase order. Once an image is identified, framed image computing device 102 relies on a table (e.g., stored in database 116) that stores possible frame and/or mat options (e.g., sizes, types, styles, etc.) that are available for each image. Framed image computing device 102 may then execute a rule-based model and/or a machine learning model to determine an image size for each purchased image based on the identified image and frame and/or mat options.

Figure 6:
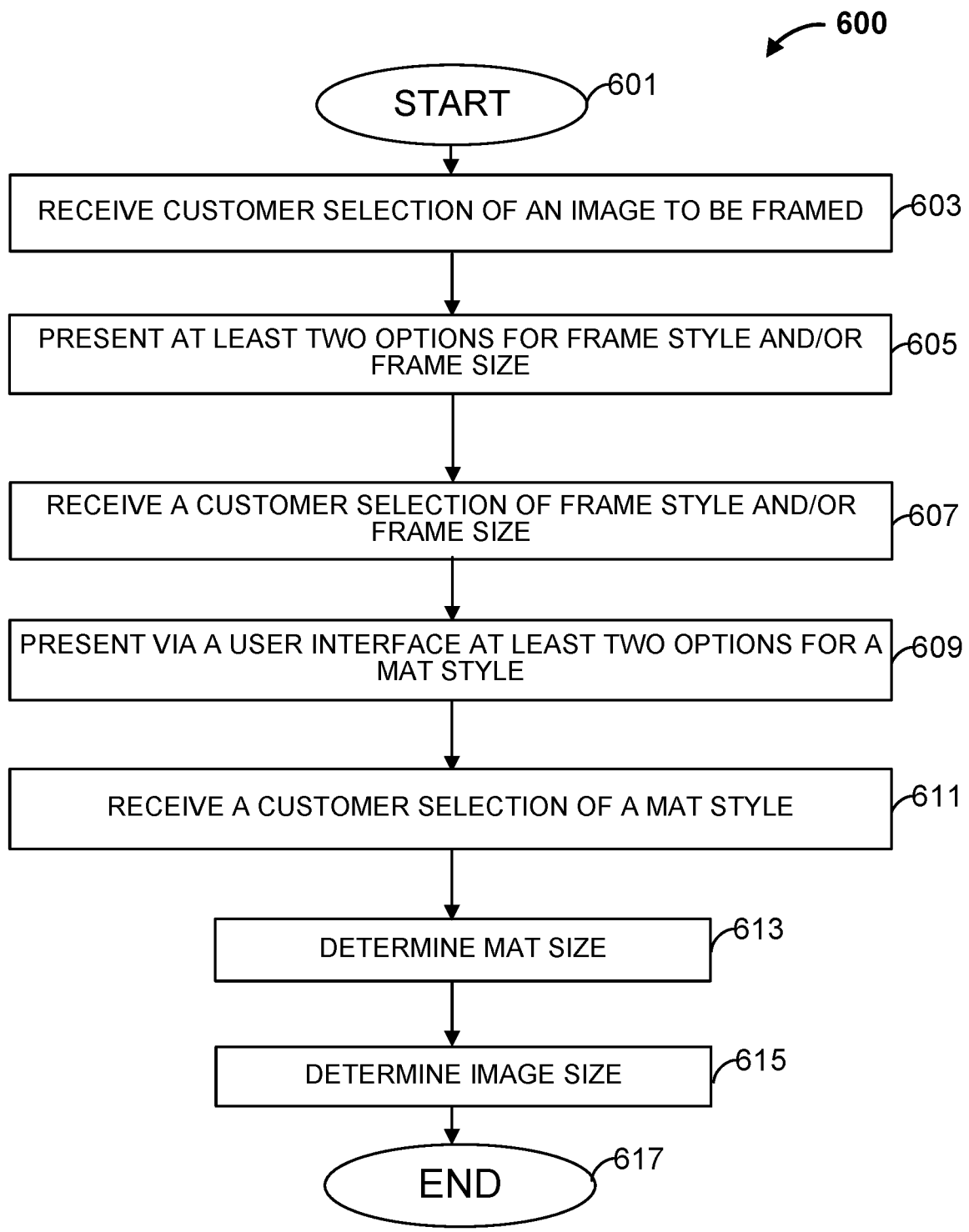
FIG. 6 is a flowchart of an example method that can be carried out by the framed image computing device of FIG. 2 in accordance with some embodiments.

FIG. 6 is a flowchart of an example method 600 that can be carried out by the framed image computing device 102. Method 600 begins at step 601. At step 603 a computing device, such as framed image computing device 102, receives a customer selection of an image 441 to be framed. The framed image computing device 102 may receive the customer's selection via a website or an in-store purchase, and data relating to the selection may be transmitted to the framed image computing device 102 via a network such as the Internet. The selected image 441 may be a print on demand image.

At step 605 at least two options for one or both of frame style and/or frame size are presented to the customer. The options may be determined by the framed image computing device 102, and may be determined at least in part based on the selection of the image 441. The options for frame size may be standardized frame sizes. The framed image computing device 102 may determine the frame style and/or frame size options based using a rule-based model. The framed image computing device 102 may access rules and/or the rule-based model stored in a database accessed by the framed image computing device 102 or internal to the framed image computing device 102.

At step 607 the framed image computing device 102 receives a customer selection of one or both of a frame style and/or frame size. The selections may be received simultaneously or may be received in series. For example, a selection of frame style may be received leading the framed image computing device 102 to present options for frame size and then a frame size selection may be received, or vice versa.

At step 609 the framed image computing device 102 may determine and present to the customer options for one or both of mat style and/or mat size. The options may be determined by the framed image computing device 102, and may be determined at least in part based on the previous selections of the image 441, frame style, and/or frame size. The options for mat size may be standardized mat sizes. The framed image computing device 102 may determine the mat style and/or mat size options based using a rule-based model. The framed image computing device 102 may access rules and/or the rule-based model stored in a database accessed by the framed image computing device 102 or internal to the framed image computing device 102. In some embodiments at step 609 options are presented only for mat style.

At step 611 the framed image computing device 102 receives a customer selection of one or both of a mat style and/or mat size. The selections may be received simultaneously or may be received in series. For example, a selection of mat style may be received leading the framed image computing device 102 to present options for mat size and then a mat size selection may be received, or vice versa. In some embodiments at step 611 a customer selection is received only for a mat style.

Notably, steps 609 and 611 may be performed before steps 605 and 607. The customer may be presented with options for mat style and/or mat size, and selections for mat style and/or mat size may be received at the framed image computing device 102 prior to presenting options to the customer for frame style and/or frame size. In this case, the options for frame style and/or frame size may be determined at least in part based on the previous selections of the image 441, mat style, and/or mat size.

In some embodiments at step 613 a mat size is determined by the framed image computing device 102. The mat size may be determined based at least in part on the image 411 selected, and customer selections for one or more of frame style, frame size, and mat style. The framed image computing device 102 may use a rule-based model to determine the mat size.

At step 615 an image size for the image 411 is determined based at least in part on the image 411 selected, and customer selections for one or more of frame style, frame size, mat style, and mat size. The image may be then be scaled based on the image size. In some examples, the image 411 is scaled to have dimensions equal or substantially equal to the (e.g., selected) mat window. Once the image size is determined, the image may be printed in the image size for assembly in a framed image consistent with the customer's selections. In some embodiments, the image size is determined based on the mat window size. In some examples, the framed image computing device 102 may use a rule-based model to determine the image size.

Method 600 ends at step 617.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising: a computing device configured to:
   receive, by a transceiver of the computing device, over one or more networks and from a customer device of a customer, a purchase order of an image;
   transmit, by the transceiver, over the one or more networks and to the customer device, a first dataset that causes the customer device to prompt the customer to select a frame style and a frame size, the frame size indicating dimensions of a frame window;
   receive, by the transceiver, over the one or more networks and from the customer device, a second dataset that characterizes a first customer selection of the frame style and the frame size;
   transmit, by the transceiver, over the one or more networks and to the customer device, a third dataset that causes the customer device of the customer to prompt the customer to select a mat style;
   receive, by the transceiver, over the one or more networks and from the customer device, a fourth dataset that characterizes a second customer selection of a mat style;
   determine, by a processor of the computing device, a mat size using a rule-based model based at least on the customer selections of the frame style, the frame size, and the mat style, wherein the mat size includes dimensions of a mat window;
   determine, by the processor, based at least on the dimensions of the mat window, an image size for the image using a machine learning model wherein:
      the image size has dimensions larger than the dimensions of the mat window, the rule-based model includes a plurality of rules and applies a weight based on a result of each rule of the plurality of rules that operate on store transaction data;
      the store transaction data include at least: an order number identifying the purchase order, a purchase date of the purchase order, and a household identity (ID) associated with the customer; and
      the household ID includes at least one of: an address, a phone number, or a surname associated with the customer; and
   process, by the processor, the purchase order for image printing based at least on the image size and for framed image assembly based at least on the frame style and the frame size.

2. The system of claim 1 wherein the frame size further indicates dimensions of a frame setting, and wherein the image is printed on a sheet having dimensions substantially equal to the dimensions of the frame setting.

3. The system of claim 2 wherein the mat size includes outer dimensions substantially equal to the dimensions of the frame setting.

4. The system of claim 1 wherein prompting the customer to select the mat style includes presenting, via a user interface, at least two options for the mat style.

5. The system of claim 1 wherein the computing device is further configured, after receiving the second dataset, to cause the customer device to present, via a user interface, at least two options for the mat size.

6. The system of claim 1 wherein the computing device is further configured, prior to receiving the second dataset, to receive a fifth dataset that characterizes third customer selection of the image to be framed, wherein the determination of the mat size is additionally based at least in part on the image to be framed.

7. The system of claim 6 wherein prompting the customer to select the frame type and the frame size includes presenting, via a user interface, at least two options for the frame style.

8. The system of claim 6 wherein prompting the customer to select the frame type and the frame size includes presenting, via a user interface, at least two options for the frame size.

9. The system of claim 8 wherein the at least two options for the frame size are determined for presentation via the user interface based at least in part on an aspect ratio of the image.

10. A method comprising:
receiving, over one or more networks by a transceiver of a computing device and from a customer device of a customer, a purchase order of an image;
transmitting, over the one or more networks by the transceiver of the computing device and to the customer device, a first dataset that causes the customer device to prompt the customer to select a frame style and a frame size, the frame size indicating dimensions of a frame window;
receiving, over the one or more networks by the transceiver of the computing device and from the customer device, a second dataset that characterizes a first customer selection of the frame style and the frame size;
transmitting, over the one or more networks by the transceiver of the computing device and to the customer device, a third dataset that causes the customer device of the customer to prompt the customer to select a mat style;
receiving, over the one or more networks by the transceiver of the computing device and from the customer device, a fourth dataset that characterizes a second customer selection of a mat style;
determining, by a processor of the computing device, a mat size using a rule-based model based at least on the customer selections of the frame style, the frame size, and the mat style, wherein the mat size includes dimensions of a mat window;
determining, by the processor, based at least on the dimensions of the mat window, an image size for the image using a machine learning model wherein:
the image size has dimensions larger than the dimensions of the mat window, the rule-based model includes a plurality of rules and applies a weight based on a result of each rule of the plurality of rules that operate on store transaction data;
the store transaction data include at least: an order number identifying the purchase order, a purchase date of the purchase order, and a household identity (ID) associated with the customer; and
the household ID includes at least one of: an address, a phone number, or a surname associated with the customer; and
processing, by the processor, the purchase order for image printing based at least on the image size and for framed image assembly based at least on the frame style and the frame size.

11. The method of claim 10 wherein the mat window has a first lateral dimension and the image has a second lateral dimension, and wherein the second lateral dimension is greater than the first lateral dimension.

12. The method claim 10 prompting the customer to select the mat style includes presenting, via a user interface, at least two options for the mat style.

13. The method claim 10 further comprising, after receiving the second dataset, causing the customer device to present, via a user interface, at least two options for the mat size.

14. The method claim 10 further comprising, prior to receiving the second dataset, receiving a fifth dataset that characterizes third customer selection of the image to be framed.

15. The method claim 14 wherein prompting the customer to select the frame type and the frame size includes presenting via a user interface at least two options for the frame style.

16. The method claim 15 wherein prompting the customer to select the frame type and the frame size includes presenting via the user interface at least two options for the frame size.

17. The method of claim 16 wherein the at least two options for the frame size are determined for presentation via the user interface based at least in part on an aspect ratio of the image.

18. A non-transitory computer readable medium having instructions stored thereon, wherein the instructions, when executed by at least one processor, cause a device to perform operations comprising:
receiving, by a transceiver of the device, over one or more networks and from a customer device of a customer, a purchase order of an image;
transmitting, by the transceiver, over the one or more networks and to the customer device, a first dataset that causes the customer device to prompt the customer to select a frame style and a frame size, the frame size indicating dimensions of a frame window;
receiving, by the transceiver, over the one or more networks and from the customer device, a second dataset that characterizes a first customer selection of the frame style and the frame size;
transmitting, by the transceiver, over the one or more networks and to the customer device, a third dataset that causes the customer device of the customer to prompt the customer to select a mat style;
receiving, by the transceiver, over the one or more networks and from the customer device, a fourth dataset that characterizes a second customer selection of a mat style;
determining, by a processor of the computing device, a mat size using a rule-based model based at least on the customer selections of the frame style, the frame size, and the mat style, wherein the mat size includes dimensions of a mat window;
determining, by the processor, based at least on the dimensions of the mat window, an image size for the image using a machine learning model wherein:
the image size has dimensions larger than the dimensions of the mat window, the rule-based model includes a plurality of rules and applies a weight based on a result of each rule of the plurality of rules that operate on store transaction data;
the store transaction data include at least: an order number identifying the purchase order, a purchase date of the purchase order, and a household identity (ID) associated with the customer; and
the household ID includes at least one of: an address, a phone number, or a surname associated with the customer; and
processing, by the processor, the purchase order for image printing based at least on the image size and for framed image assembly based at least on the frame style and the frame size.

19. The non-transitory computer readable medium of claim 18 wherein the instructions, when executed by the at least one processor, cause the device to perform further operations comprising:

receiving, prior to receiving the second dataset, a fifth dataset that characterizes a third customer selection of the image to be framed.

\* \* \* \* \*